United States Patent
Fein et al.

(10) Patent No.: US 8,452,844 B2
(45) Date of Patent: May 28, 2013

(54) DELETION IN DATA FILE FORWARDING FRAMEWORK

(75) Inventors: Gene Fein, Malibu, CA (US); Edward Merritt, Lenox, MA (US)

(73) Assignee: Tajitshu Transfer Limited Liability Company, Wilmington, DE (US)

( * ) Notice: Subject to any disclaimer, the term of this patent is extended or adjusted under 35 U.S.C. 154(b) by 246 days.

(21) Appl. No.: 12/991,383

(22) PCT Filed: May 6, 2009

(86) PCT No.: PCT/US2009/042971
§ 371 (c)(1),
(2), (4) Date: Jan. 24, 2011

(87) PCT Pub. No.: WO2009/137571
PCT Pub. Date: Nov. 12, 2009

(65) Prior Publication Data
US 2011/0125721 A1 May 26, 2011

Related U.S. Application Data

(63) Continuation of application No. 12/116,610, filed on May 7, 2008, now abandoned.

(51) Int. Cl.
*G06F 15/167* (2006.01)
*G06F 15/16* (2006.01)

(52) U.S. Cl.
USPC .......................................... 709/212; 709/206

(58) Field of Classification Search
USPC ................................................ 709/206, 212
See application file for complete search history.

(56) References Cited

U.S. PATENT DOCUMENTS

| | | | |
|---|---|---|---|
| 3,786,424 | A | 1/1974 | McVoy et al. |
| 5,751,928 | A | 5/1998 | Bakalash |
| 5,774,553 | A | 6/1998 | Rosen |
| 5,787,258 | A | 7/1998 | Costa et al. |
| 5,978,485 | A | 11/1999 | Rosen |
| 5,978,839 | A | 11/1999 | Okuhara et al. |
| 6,085,030 | A | 7/2000 | Whitehead et al. |
| 6,151,395 | A | 11/2000 | Harkins |
| 6,205,478 | B1 | 3/2001 | Sugano et al. |
| 6,219,691 | B1 | 4/2001 | Youn |
| 6,260,159 | B1 | 7/2001 | Garnett et al. |
| 6,298,380 | B1 | 10/2001 | Coile et al. |

(Continued)

FOREIGN PATENT DOCUMENTS

| | | |
|---|---|---|
| EP | 0 458 567 | 5/1991 |
| EP | 0 722 591 | 6/1999 |

(Continued)

OTHER PUBLICATIONS

European Extended Search Report, re EP Application No. 09816904.8, dated Feb. 6, 2012.

(Continued)

*Primary Examiner* — Jerry Dennison
(74) *Attorney, Agent, or Firm* — Knobbe, Martens, Olson & Bear LLP (57) ABSTRACT

Methods and apparatus, including computer program products, for deletion in data file forwarding framework. A framework includes a network of interconnected computer system nodes in which data files are continuously forwarded from computer memory to computer memory without storing on any physical storage device in the network, a central server coupled to the network, and a deletion server coupled to the network.

20 Claims, 8 Drawing Sheets

U.S. PATENT DOCUMENTS

| | | |
|---|---|---|
| 6,505,213 B1 | 1/2003 | Kamada et al. |
| 6,549,957 B1 | 4/2003 | Hanson et al. |
| 6,587,866 B1 | 7/2003 | Modi et al. |
| 6,650,640 B1 | 11/2003 | Muller et al. |
| 6,677,976 B2 | 1/2004 | Parker et al. |
| 6,684,258 B1 | 1/2004 | Gavin et al. |
| 6,721,275 B1 | 4/2004 | Rodeheffer et al. |
| 6,724,767 B1 | 4/2004 | Chong et al. |
| 6,745,289 B2 | 6/2004 | Gruner et al. |
| 6,907,447 B1 | 6/2005 | Cooperman et al. |
| 6,941,338 B1 | 9/2005 | Madsen |
| 6,983,303 B2 | 1/2006 | Pellegrino et al. |
| 6,985,476 B1 | 1/2006 | Elliott et al. |
| 7,007,142 B2 | 2/2006 | Smith |
| 7,035,933 B2 | 4/2006 | O'Neal et al. |
| 7,043,530 B2 | 5/2006 | Isaacs et al. |
| 7,061,923 B2 | 6/2006 | Dugan et al. |
| 7,103,824 B2 | 9/2006 | Halford |
| 7,120,631 B1 | 10/2006 | Vahalia et al. |
| 7,136,638 B2 | 11/2006 | Wacker et al. |
| 7,143,170 B2 | 11/2006 | Swildens et al. |
| 7,191,298 B2 | 3/2007 | Kaminsky et al. |
| 7,197,576 B1 | 3/2007 | Lo et al. |
| 7,209,973 B2 | 4/2007 | Tormasov et al. |
| 7,240,214 B2 | 7/2007 | Gazzetta et al. |
| 7,266,776 B2 | 9/2007 | Quillen et al. |
| 7,274,706 B1 | 9/2007 | Nguyen et al. |
| 7,277,941 B2 | 10/2007 | Ignatius et al. |
| 7,295,556 B2 | 11/2007 | Roese et al. |
| 7,320,059 B1 | 1/2008 | Armangau et al. |
| 7,327,731 B1 | 2/2008 | Kumar et al. |
| 7,346,063 B1 | 3/2008 | Herbst |
| 7,346,909 B1 | 3/2008 | Eldar et al. |
| 7,356,540 B2 | 4/2008 | Smith et al. |
| 7,356,567 B2 | 4/2008 | Odell et al. |
| 7,363,316 B2 | 4/2008 | Anderson et al. |
| 7,366,868 B2 | 4/2008 | Reuter et al. |
| 7,404,002 B1 | 7/2008 | Pereira |
| 7,424,514 B2 | 9/2008 | Noble et al. |
| 7,426,471 B1 | 9/2008 | Briscoe et al. |
| 7,426,574 B2 | 9/2008 | Liao |
| 7,426,637 B2 | 9/2008 | Risan et al. |
| 7,426,745 B2 | 9/2008 | McCarty |
| 7,428,219 B2 | 9/2008 | Khosravi |
| 7,428,540 B2 | 9/2008 | Coates et al. |
| 7,430,584 B1 | 9/2008 | Fein et al. |
| 7,529,784 B2 | 5/2009 | Kavuri et al. |
| 7,599,997 B1 | 10/2009 | Fein et al. |
| 7,631,051 B1 | 12/2009 | Fein et al. |
| 7,631,052 B2 | 12/2009 | Fein et al. |
| 7,636,758 B1 | 12/2009 | Fein et al. |
| 7,636,759 B1 | 12/2009 | Fein et al. |
| 7,636,760 B1 | 12/2009 | Fein et al. |
| 7,636,761 B1 | 12/2009 | Fein et al. |
| 7,636,762 B1 | 12/2009 | Fein et al. |
| 7,636,763 B1 | 12/2009 | Fein et al. |
| 7,636,764 B1 | 12/2009 | Fein et al. |
| 7,668,926 B2 | 2/2010 | Fein et al. |
| 7,668,927 B2 | 2/2010 | Fein et al. |
| 7,673,009 B2 | 3/2010 | Fein et al. |
| 7,685,248 B1 | 3/2010 | Fein et al. |
| 7,844,695 B2 | 11/2010 | Fein et al. |
| 7,877,456 B2 | 1/2011 | Fein et al. |
| 7,924,888 B2 | 4/2011 | Schultze et al. |
| 8,266,237 B2 | 9/2012 | Moore et al. |
| 8,386,585 B2 | 2/2013 | Fein et al. |
| 2002/0158899 A1 | 10/2002 | Raymond |
| 2002/0194371 A1 | 12/2002 | Kadoi |
| 2003/0093463 A1 | 5/2003 | Graf |
| 2003/0101200 A1 | 5/2003 | Koyama et al. |
| 2003/0137880 A1 | 7/2003 | Barrenscheen et al. |
| 2003/0158958 A1 | 8/2003 | Chiu |
| 2004/0064633 A1 | 4/2004 | Oota |
| 2004/0093390 A1 | 5/2004 | Oberdorfer |
| 2004/0165525 A1 | 8/2004 | Burak |
| 2004/0223503 A1 | 11/2004 | Lynch et al. |
| 2004/0250029 A1 | 12/2004 | Ji et al. |
| 2005/0010647 A1 | 1/2005 | Durham |
| 2005/0010685 A1 | 1/2005 | Ramnath et al. |
| 2005/0015466 A1 | 1/2005 | Tripp |
| 2005/0044162 A1 | 2/2005 | Liang et al. |
| 2005/0071568 A1 | 3/2005 | Yamamoto et al. |
| 2005/0131984 A1 | 6/2005 | Hofmann et al. |
| 2005/0201409 A1 | 9/2005 | Griswold et al. |
| 2005/0216473 A1 | 9/2005 | Aoyagi et al. |
| 2005/0216727 A1 | 9/2005 | Chattopadhyay et al. |
| 2005/0240749 A1 | 10/2005 | Clemo et al. |
| 2005/0243823 A1 | 11/2005 | Griswold et al. |
| 2006/0031593 A1 | 2/2006 | Sinclair |
| 2006/0091007 A1 | 5/2006 | Inoue et al. |
| 2006/0095512 A1 | 5/2006 | Noma |
| 2006/0143505 A1 | 6/2006 | Olarig |
| 2006/0159456 A1 | 7/2006 | Gumaste et al. |
| 2006/0209822 A1 | 9/2006 | Hamamoto et al. |
| 2006/0212551 A1 | 9/2006 | Kao et al. |
| 2006/0242212 A1 | 10/2006 | Brinkmann et al. |
| 2007/0005694 A1 | 1/2007 | Popkin et al. |
| 2007/0011097 A1 | 1/2007 | Eckleder |
| 2007/0050446 A1 | 3/2007 | Moore |
| 2007/0050761 A1 | 3/2007 | Hester et al. |
| 2007/0055765 A1 | 3/2007 | Lisiecki et al. |
| 2007/0058606 A1 | 3/2007 | Koskelainen |
| 2007/0073965 A1 | 3/2007 | Rajakarunanayake |
| 2007/0079087 A1 | 4/2007 | Wang et al. |
| 2007/0186068 A1 | 8/2007 | Agrawal |
| 2007/0195772 A1 | 8/2007 | Shadish |
| 2007/0214105 A1 | 9/2007 | Sfarti et al. |
| 2007/0266220 A1 | 11/2007 | Nelson |
| 2007/0271349 A1 | 11/2007 | Clemo et al. |
| 2008/0013448 A1 | 1/2008 | Horie et al. |
| 2008/0016564 A1 | 1/2008 | Claudatos et al. |
| 2008/0037777 A1 | 2/2008 | Ignatius et al. |
| 2008/0059495 A1 | 3/2008 | Kiessig et al. |
| 2008/0071855 A1 | 3/2008 | Farber et al. |
| 2008/0084330 A1 | 4/2008 | Picard |
| 2008/0091744 A1 | 4/2008 | Shitomi et al. |
| 2008/0095075 A1 | 4/2008 | Monier |
| 2008/0101277 A1 | 5/2008 | Taylor et al. |
| 2008/0104085 A1 | 5/2008 | Papoutsakis et al. |
| 2008/0114891 A1 | 5/2008 | Pereira |
| 2008/0144655 A1 | 6/2008 | Beam et al. |
| 2008/0151893 A1 | 6/2008 | Nordmark et al. |
| 2008/0155094 A1 | 6/2008 | Roese et al. |
| 2008/0155252 A1 | 6/2008 | Nambiar |
| 2008/0155275 A1 | 6/2008 | Natarajan et al. |
| 2008/0155537 A1 | 6/2008 | Dinta et al. |
| 2008/0181224 A1 | 7/2008 | Van Hensbergen et al. |
| 2008/0222415 A1 | 9/2008 | Munger et al. |
| 2008/0222492 A1 | 9/2008 | Earhart et al. |
| 2008/0225842 A1 | 9/2008 | Goldfein et al. |
| 2008/0225888 A1 | 9/2008 | Valluri et al. |
| 2008/0228943 A1 | 9/2008 | Balus et al. |
| 2008/0313318 A1 | 12/2008 | Vermeulen et al. |
| 2009/0006808 A1 | 1/2009 | Blumrich et al. |
| 2009/0036171 A1 | 2/2009 | Palenius |
| 2009/0063419 A1 | 3/2009 | Nurminen et al. |
| 2009/0067322 A1 | 3/2009 | Shand et al. |
| 2009/0092124 A1 | 4/2009 | Singhal et al. |
| 2009/0104978 A1 | 4/2009 | Ben-Ami |
| 2009/0141621 A1 | 6/2009 | Fan et al. |
| 2009/0204320 A1 | 8/2009 | Shaffer et al. |
| 2009/0228593 A1 | 9/2009 | Takeda |
| 2009/0234933 A1 | 9/2009 | Fein et al. |
| 2009/0238167 A1 | 9/2009 | Fein et al. |
| 2009/0254567 A1 | 10/2009 | Fein et al. |
| 2009/0300635 A1 | 12/2009 | Ferris |
| 2010/0185581 A1 | 7/2010 | Bakalash |
| 2011/0125721 A1 | 5/2011 | Fein |
| 2011/0138075 A1 | 6/2011 | Fein |
| 2011/0167131 A1 | 7/2011 | Fein |
| 2011/0179131 A1 | 7/2011 | Fein |

FOREIGN PATENT DOCUMENTS

| | | |
|---|---|---|
| EP | 1 048 998 | 11/2000 |
| EP | 1 968 257 | 9/2003 |
| EP | 1 357 476 A | 10/2003 |
| EP | 1406446 A1 | 4/2004 |

| | | |
|---|---|---|
| EP | 1 802 051 | 11/2006 |
| EP | 1322068 B1 | 11/2006 |
| EP | 1 746 790 | 1/2007 |
| EP | 1 372 316 | 5/2007 |
| EP | 1798934 A1 | 6/2007 |
| EP | 1798937 A1 | 6/2007 |
| EP | 1826968 A1 | 8/2007 |
| EP | 1485787 B1 | 10/2007 |
| EP | 1776639 B1 | 12/2007 |
| EP | 1479236 B1 | 1/2008 |
| EP | 1 931 090 | 6/2008 |
| JP | 56-116144 | 9/1981 |
| JP | 56-116145 | 9/1981 |
| JP | 61-165889 | 7/1986 |
| JP | 06-021953 | 1/1994 |
| JP | 06-068047 | 3/1994 |
| JP | 10-254761 | 9/1998 |
| JP | 11-065911 | 3/1999 |
| JP | 2002-510409 | 4/2002 |
| JP | 2002-268952 | 9/2002 |
| JP | 2003-296176 | 10/2003 |
| JP | 2003-296179 | 10/2003 |
| JP | 2005-070987 | 3/2005 |
| JP | 2005-216241 | 8/2005 |
| JP | 2005-310126 | 11/2005 |
| JP | 2005-339325 | 12/2005 |
| JP | 2007-304665 | 11/2007 |
| JP | 2007-310673 | 11/2007 |
| JP | 2008-052340 | 3/2008 |
| JP | 2008-192129 | 8/2008 |
| JP | 2008-537258 | 9/2008 |
| JP | 2011-519097 | 6/2011 |
| JP | 2011-528141 | 11/2011 |
| WO | WO 94/04991 | 3/1994 |
| WO | WO 97/19427 A2 | 5/1997 |
| WO | WO 97/19427 A3 | 5/1997 |
| WO | WO 01/67303 | 9/2001 |
| WO | WO 02/052417 | 7/2002 |
| WO | WO 2004/059529 | 7/2004 |
| WO | WO 2005/062578 | 7/2005 |
| WO | WO 2006/115594 | 11/2006 |
| WO | WO 2006/124084 | 11/2006 |
| WO | WO 2006/124217 | 11/2006 |
| WO | WO 2007/001631 | 1/2007 |
| WO | WO 2009/021289 | 2/2007 |
| WO | WO 2007/031593 | 3/2007 |
| WO | WO 2008/006079 | 1/2008 |
| WO | WO 2008/070958 | 6/2008 |
| WO | WO 2008/094930 | 8/2008 |
| WO | WO 2008/108699 | 9/2008 |
| WO | WO 2008/109390 | 9/2008 |
| WO | WO 2009/117259 | 9/2009 |
| WO | WO 2009/126418 | 10/2009 |
| WO | WO 2009/132345 | 10/2009 |
| WO | WO 2009/137571 | 11/2009 |
| WO | WO 2010/005928 | 1/2010 |
| WO | WO 2010/005935 | 1/2010 |
| WO | WO 2010/014368 | 2/2010 |
| WO | WO 2010/036712 | 4/2010 |
| WO | WO 2010/036881 | 4/2010 |
| WO | WO 2010/036883 | 4/2010 |
| WO | WO 2010/036886 | 4/2010 |
| WO | WO 2010/036887 | 4/2010 |
| WO | WO 2010/036891 | 4/2010 |

OTHER PUBLICATIONS

Australian Office Action, re AU Application No. 2009-268716, dated Feb. 29, 2012.
Japanese Office Action, re JP Application No. 2011-506496, dated Mar. 21, 2012.
U.S. Notice of Allowance re U.S. Appl. No. 12/052,345, dated Dec. 29, 2011.
European Extended Search Report, re EP Application No. 09795041, dated Oct. 11, 2011.
Japanese Office Action dated Apr. 13, 2012, re JP App. No. 2011-517515.
U.S. Notice of Allowance re U.S. Appl. No. 12/052,345, dated Apr. 2, 2012.
Japanese Office Action re JP Application No. 2011-529255, dated Apr. 26, 2012.
Japanese Office Action, re JP App. No. 2011-529258, dated Apr. 26, 2012.
Purczynski, et al.: "Juggling with packets: floating data storage," Internet Archive, Oct. 2003. [retrieved on Apr. 25, 2012]. Retrieved from the Internet: <URL: http://web.archive.org/web/20031017082346/http://lcamtuf.coredump.cx/juggling_with_packets.txt>.
Akasaka, Tsutomu, "Remote Copy Technology of ETERNUS6000 and ETERNUS3000 Disk Arrays", Fujitsu Sci. Tech. J., Jan. 2006, vol. 42, Issue 1, pp. 9-16.
Amazon Elastic Compute Cloud (Amazon EC2)—Limited Beta, Amazon.com: Amazon EC2, Amazon Elastic Compute Cloud, Virtual Grid Computing: . . . p. 1 of 9, http://web.archive.org/web/20070705164650rn_2/www.amazon.com/b?ie=UTF8&node=2 . . . Jun. 18, 2010.
Aref, et al.: "Nile: A Query Processing Engine for Data Streams", Department of Computer Sciences Purdue University, West Lafayette, IN., USA, Data Engineering, 2004. Proceedings. 20th International Conference on Mar. 30-Apr. 2, 2004.
Ari, Ismail: "Design and Management of Globally-Distributed Network Caches", University of California Santa Cruz, Sep. 2004, 220 pages.
Cheeha Kim, "An Efficient Multicast Data Forwarding Scheme for Mobile Ad Hoc Networks", Information Networking, Convergence in Broadband and Mobile Networking, International Conf., Lecture Notes in Computer Science, Jan. 31-Feb. 2, 2005, vol. 3391/2005, 510-519, DOI: 10.1007/978-3-540-30582-8_53.
EPO Exam Report re App. No. 09723251.6, dated Nov. 11, 2010.
Ertaul et al.: "ECC Based Threshold Cryptography for Secure Data Forwarding and Secure Key Exchange in Manet (I)", LNCS 3462, pp. 102-113, Networking 2005, May 2-6, 2005 University of Waterloo, Waterloo Ontario Canada.
Ertaul et al: "Implementation of Homomorphic Encryption Schemes for Secure Packet Forwarding in Mobile Ad Hoc Networks (MANETs)", IJCSNS, vol. 7, Issue No. 11, pp. 132-141, Nov. 2007.
Girao et al.: "TinyPEDS: Tiny Persistent Encrypted Data Storage in Asynchronous Wireless Sensor Networks", Ad Hoc Networks, vol. 5, Issue 7, p. 1073-1089 (Sep. 2007).
Hoke, et al.: "InteMon: Continuous Mining of Sensor Data in Large-scale Self-* Infrastructures", Carnegie Mellon University. Appears in ACM SIGOPS Operating Systems Review, 40(3): pp. 38-44. ACM Press, Jul. 2006.
Huang et al., "Secure Data Forwarding in Wireless Ad Hoc Networks", IEEE International Conference, May 16-20, 2005, pp. 3535-3531, vol. 5.
Ito, Takeshi et al. "Technologies of ETERNUSVS900 Storage Virtualization Switch", Fujitsu Sci. Tech. J., Jan. 2006, vol. 42, Issue 1, pp. 17-23.
Ji, Lusheng et al., "On Providing Secure and Portable Wireless Data Networking Services: Architecture and Data Forwarding Mechanisms", IPSJ Journal, Oct. 2004, vol. 45, Issue 10, pp. 2261-2269.
Kim, Youngmin, "An Efficient Multicast Data Forwarding Scheme for Mobile Ad Hoc Networks", Information Networking, Convergence in Broadband and Mobile Networking, International Conf., 2005, vol. ICOIN 2005, Jeju Island, Korea, Jan. 31-Feb. 2, 2005.
Komandur et al., "SPAM: A Data Forwarding Model for Multipoint-to-Multipoint Connection Support in ATM Networks", IC3N, IEEE Computer Society, Sep. 1997, pp. 1-7.
Mellor, Chris: "Storage in the cloud—Doppler shift or marketing gloss?", Storage in the cloud—Feature—Techworld.com, Published: 12:00, Dec. 18, 2007, http://features.techworld.com/storage/3893/storage-in-the-cloud/.
PCT International Preliminary Report and Report on Patentability re App. No. PCT/US2009/49763, dated Jan. 20, 2011.
PCT International Preliminary Report on Patentability and Written Opinion re App. No. PCT/US2009/041817, dated Oct. 26, 2010.
PCT International Preliminary Report on Patentability and Written Opinion re App. No. PCT/US2009/042971, dated Nov. 9, 2010.
PCT International Preliminary Report on Patentability and Written Opinion re App. No. PCT/US2009/49755, dated Jan. 20, 2011.

PCT International Preliminary Report on Patentability and Written Opinion re App. No. PCT/US2009/58052, dated Mar. 29, 2011.
PCT International Preliminary Report on Patentability and Written Opinion re App. No. PCT/US2009/58364, dated Mar. 29, 2011.
PCT International Preliminary Report on Patentability and Written Opinion re App. No. PCT/US2009/58367, dated Mar. 29, 2011.
PCT International Preliminary Report on Patentability and Written Opinion re App. No. PCT/US2009/58368, dated Mar. 29, 2011.
PCT International Preliminary Report on Patentability and Written Report re App. No. PCT/US2009/58376, dated Mar. 29, 2011, mailed on Apr. 7, 2011.
PCT International Report on Patentability and Written Opinion Re PCT/US2009/036171 dated Sep. 21, 2010.
PCT International Report on Patentability and Written Opinion re PCT/US2009/037579, dated Oct. 12, 2010.
PCT International Report on Patentability re App. No. PCT/US2009/50008, dated Feb. 10, 2011.
PCT International Search Report and Written Opinion, PCT/US2009/036171, dated Sep. 4, 2009 in 13 pgs.
PCT International Search Report and Written Opinion, PCT/US2009/037579, dated Jun. 24, 2009, 12 pages.
PCT International Search Report re App. No. PCT/US2009/41817, dated Jun. 30, 2009.
PCT International Search Report re App. No. PCT/US2009/42971, dated Jun. 24, 2009.
PCT International Search Report re App. No. PCT/US2009/49755, dated Aug. 7, 2009.
PCT International Search Report re App. No. PCT/US2009/49763, dated Oct. 16, 2009.
PCT International Search Report re App. No. PCT/US2009/50008, dated Aug. 11, 2009.
PCT International Search Report re App. No. PCT/US2009/58052, dated Nov. 4, 2009.
PCT International Search Report re App. No. PCT/US2009/58362, dated Nov. 2, 2009.
PCT International Search Report re App. No. PCT/US2009/58368, dated Oct. 26, 2009.
PCT International Search Report re App. No. PCT/US2009/58376, dated Oct. 28, 2009.
PCT International Search Report, re App. No. PCT/US2009/58364, dated Nov. 4, 2009.
PCT International Search Report, re App. No. PCT/US2009/58367, dated Oct. 26, 2009.
Sharma, et al.: "Data Warehouse and Olap Technology Part-1", power point presentation, first cited on Sep. 29, 2008 in Application No. 12/241,003.
Stefansson, et al.: "MyriadStore: Technical Report", Swedish Institute of Computer Science (SICS), Technical Report T2006:09, ISSN 1100-3154, ISRN: SCIS-T02006/09-SE. May 3, 2006 in 13 pages.
U. S. Non-Final Office Action mailed May 14, 2009, re U.S. Appl. No. 12/132,804.
U. S. Notice of Allowance mailed Aug. 7, 2008, re U.S. Appl. No. 12/046,757.
U. S. Notice of Allowance mailed Jul. 15, 2009, re U.S. Appl. No. 12/132,804.
U. S. Notice of Allowance mailed Jul. 26, 2010, re U.S. Appl. No. 12/240,802.
U. S. Notice of Allowance mailed Sep. 15, 2010, re U.S. Appl. No. 12/099,498.
U. S. Office Action re U.S. Appl. No. 12/240,757, dated Jun. 22, 2009.
U.S. Non-Final Office Action mailed Apr. 16, 2010, re U.S. Appl. No. 12/099,498.
Wagner, et al.: "A Network Application Programming Interface for Data Processing in Sensor Networks", Rice University Technical Report TREE0705. 10 pages, Submitted to IPSN (Jan. 2007)—http://www.citeulike.org/user/leosteinfeld/article/5146294.
Australian Office Action re AU Application No. 2009240392, dated May 1, 2012.
Australian Office Action re AU Application No. 2009268792, dated Jun. 8, 2012.
Australian Office Action, re AU Application No. 2009296496, dated May 23, 2012.

Japanese Office Action (Notice of Rejection), re JP Application No. JP 2011-500858, dated May 29, 2012.
Japanese Office Action re JP Application No. JP 2011-521163, dated May 23, 2012.
Korean Office Action, re KR Application No. 10-2011-7000703, dated Jul. 16, 2012.
Wojciech Purczynski et al.: "Juggling with packets: floating data storage," Internet Archive, Oct. 2003. [retrieved on Apr. 25, 2012]. Retrieved from the Internet<URL: http://web.archive.org/web/20031017082346/http://lcamtuf.coredump.cx/juggling_with_packets.txt.
European Office Action, re EP Application No. 09795041, dated Aug. 9, 2012.
U. S. Interview Summary mailed Aug. 8, 2012, re U.S. Appl No. 12/989,638.
U. S. Office Action re U.S. Appl. No. 13/003,505, dated Aug. 22, 2012.
U.S. Interview Summary mailed Aug. 6, 2012, re U.S. Appl. No. 13/057,072.
U.S. Interview Summary mailed Aug. 6, 2012, re U.S. Appl. No. 13/119,124.
U.S. Interview Summary mailed Aug. 7, 2012, re U.S. Appl. No. 13/003,502.
U.S. Interview Summary mailed Aug. 7, 2012, re U.S. Appl. No. 13/119,122.
U.S. Interview Summary mailed Aug. 7, 2012, re U.S. Appl. No. 13/119,147.
U.S. Interview Summary re U.S. Appl. No. 13/119,133, dated Aug. 7, 2012.
U.S. Notice of Allowance mailed Aug. 31, 2012, re U.S. Appl. No. 13/119,133.
U.S. Office Action re U.S. Appl. No. 12/052,345, dated Oct. 4, 2011.
Japanese Office Action, re JP Application No. 2011-504044, dated Sep. 4, 2012.
EPO, Extended Search Report re EPO App. No. 09734559.9, dated Jul. 25, 2011.
Pakkala, D. et al.: "Towards a Peer-to-Peer Extended Content Delivery Network", pp. 1-5, XP002615892, retrieved from the Internet: Url:http://www.eurasip.org/Proceedings/Ext/IST05/papers/99.pdf on Jan. 7, 2011.
Pierre, G. et al.: "Globule: A Collaborative Content Delivery Network", IEEE Communications Magazine, vol. 44, No. 8, Aug. 1, 2006, pp. 127-133.
Tanenbaum, Andrew S.: "Network Protocols", Computing Surveys, vol. 13, No. 4, Dec. 1, 1981, pp. 453-489.
Australian Office Action re AU Application No. 2009268792, dated Nov. 13, 2012.
Australian Office Action (Exam Report No. 2) re AU Application No. 2009240392, dated Sep. 25, 2012.
European Extend Search Report, re EP Application No. 09743557.2, dated Nov. 9, 2012.
Japanese Decision of Rejection re JP Application No. 2011-529255, dated Nov. 14, 2012.
Japanese Office Action re JP Application No. 2011-508626, dated Sep. 27, 2012.
U. S. Interview Summary re U.S. Appl. No. 13/003,505, dated Sep. 20, 2012.
U.S. Notice of Allowance mailed Sep. 17, 2012, re U.S. Appl. No. 13/057,072.
U.S. Notice of Allowance re U.S. Appl. No. 12/989,638, dated Nov. 5, 2012.
Hirose, et al., "Computer Software Dictionary," Japan, Maruzen Company, Limited, Apr. 5, 1996, third printing, pp. 92-93 and 106-107.
Japanese Office Action re JP Application No. 2011-529185, dated Jan. 23, 2013.
Japanese Office Action, re JP Application No. 2011-529253, dated Feb. 13, 2013.
Japanese Office Action re JP Application No. JP 2011-517508, dated Feb. 27, 2013.
U. S. Office Action re U.S. Appl. No. 13/003,505, dated Feb. 11, 2013.
U.S. Notice of Allowance mailed Dec. 6, 2012, re U.S. Appl. No. 12/052,345.

DELETION IN DATA FILE FORWARDING FRAMEWORK

CROSS REFERENCE TO RELATED APPLICATIONS

This application is a U.S. National Phase of International Application No. PCT/US2009/042971, filed May 6, 2009 which is a continuation of U.S. patent application Ser. No. 12/116,610, filed May 7, 2008 entitled "DELETION IN DATA FILE FORWARDING FRAMEWORK," each of which is hereby expressly incorporated by reference in its entirety.

BACKGROUND

At least some embodiments disclosed herein relate to data storage, and more particularly, to deletion in data file forwarding framework.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or sub-network) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for deletion in data file forwarding framework.

In one aspect, the invention features a method including, in a network of interconnected computer systems in which data files are continuously forwarded from computer memory to computer memory without storing on any physical storage device in the network, receiving a request from a source system coupled to the network to delete a data file being continuously forwarded, the request including a file name, searching an index file associated with a central server in the network for the file name, removing the file name from the index file, locating the data file represented by the file name in the network, and directing the located data file to a memory of a computer system in the network that does not forward or store data files.

In another aspect, the invention features a framework including a network of interconnected computer system nodes in which data files are continuously forwarded from computer memory to computer memory without storing on any physical storage device in the network, a central server coupled to the network, and a deletion server coupled to the network.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the figures of the accompanying drawings in which like references indicate similar elements.

DETAILED DESCRIPTION

Unlike peer to peer networks, which use data file forwarding in a transient fashion so that the data file is eventually stored on a physical medium such as a disk drive, the present invention is a continuous data file forwarding system, i.e., data files are stored by continually forwarding them from one node memory to another node memory.

Figure 1:
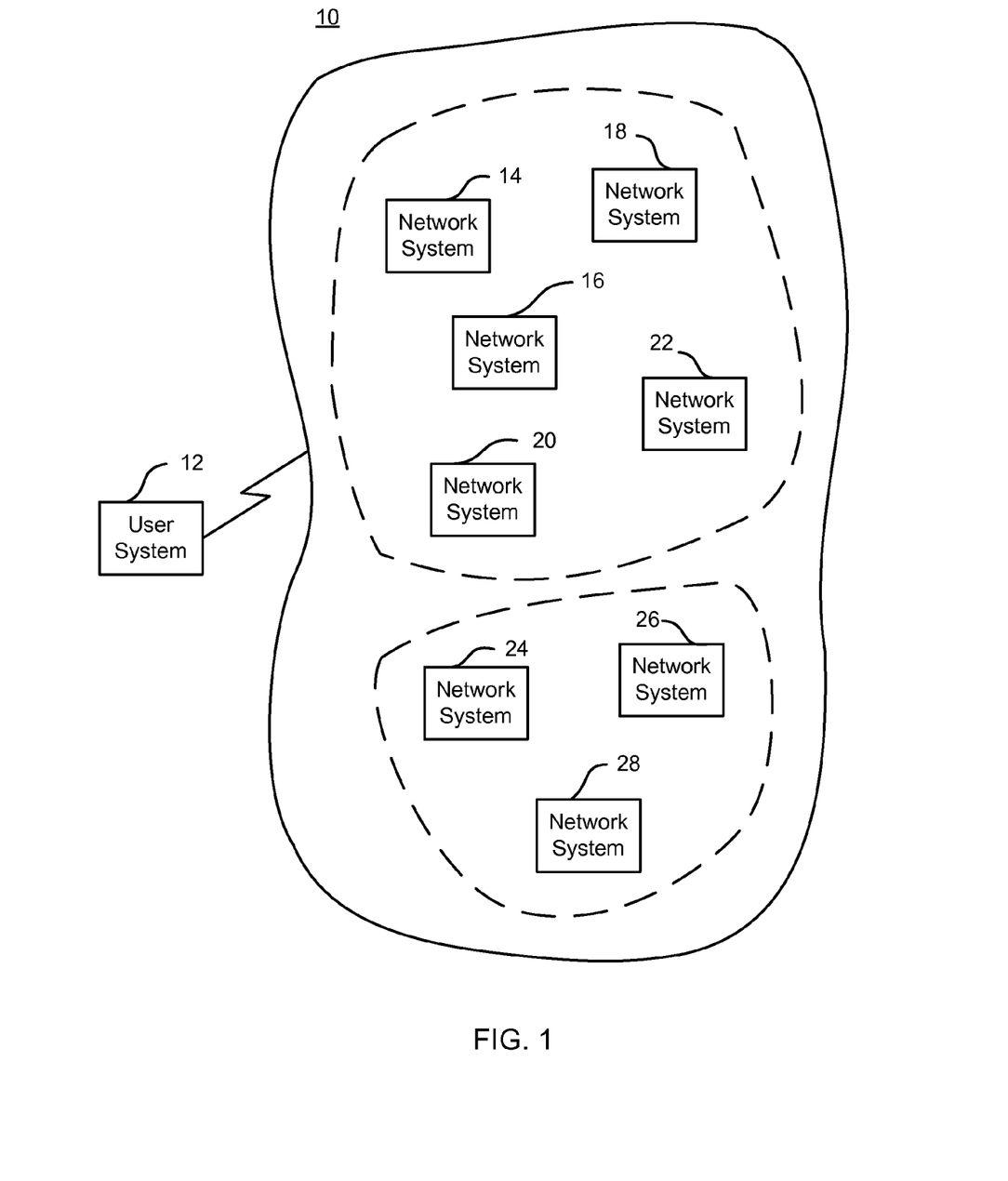
FIG. 1 is a block diagram of an exemplary framework.

As shown in FIG. 1, an exemplary framework 10 includes a user system 12 and a number of network systems 14, 16, 18, 20, 22. Each of the network systems 14, 16, 18, 20, 22 can be considered to be a node in the framework 10 and one such network system may be designated as a central server, such as network system 14, which may assume a control position in framework 10. Each of the nodes 14, 16, 18, 20, 22 may be established as a privately controlled network of peers under direct control of the central server 14. Peered nodes may also be a mix of private and public nodes, and thus not under the direct physical control of the central server 14. The framework 10 may also be wholly public where the central server 14 (or servers) has no direct ownership or direct physical control of any of the peered nodes.

In one example, nodes 14, 16, 18, 20 and 22 are considered to be a private network. In a private network, an administrator controls the nodes and may designate which node is the central server. The framework 10 can also include one or more additional nodes. For example, nodes 24, 26 and 28.

These nodes 24, 26 and 28 are considered to be part of one or more public networks in which the administrator has little or no control.

Figure 2:
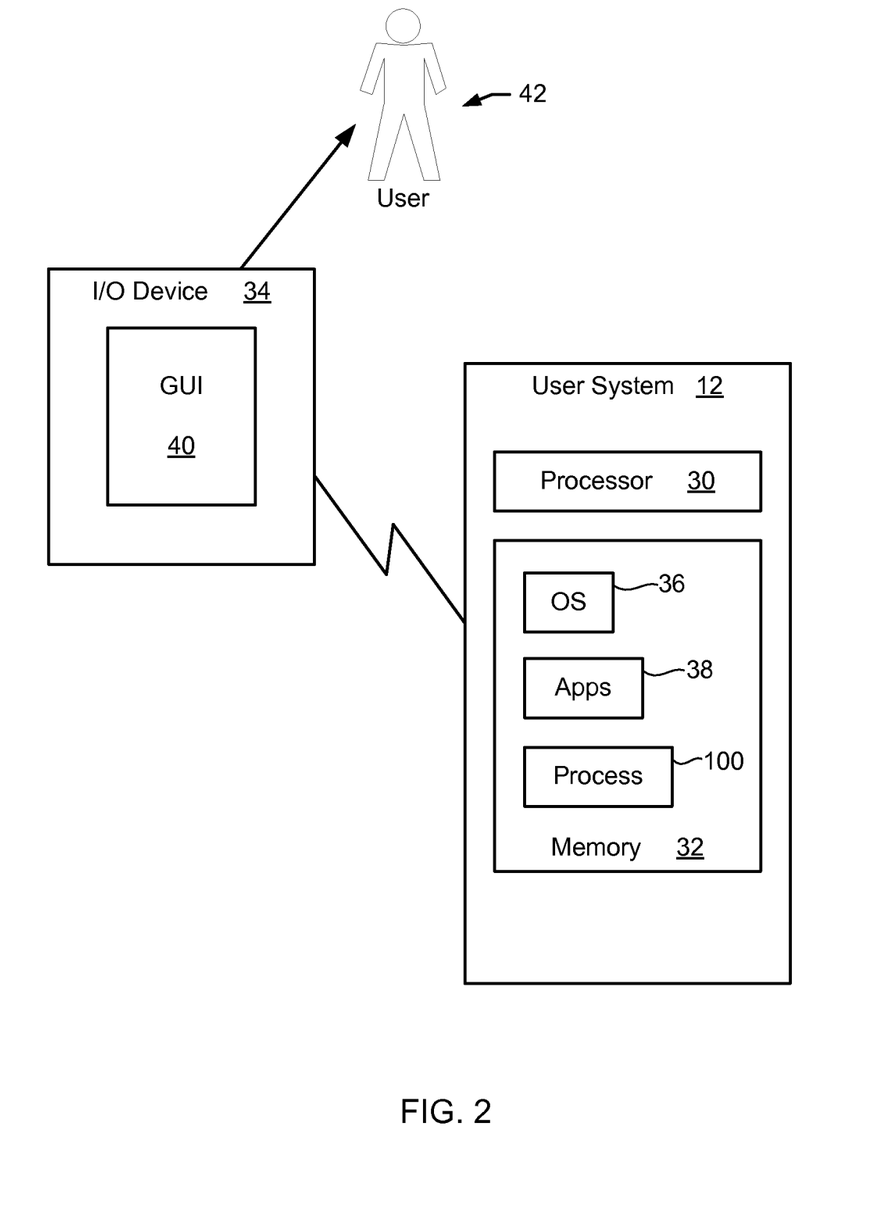
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft® Office. The I/O device 34 can include a graphical user interface (GUI) 40 for display to a user 42.

Figure 3:
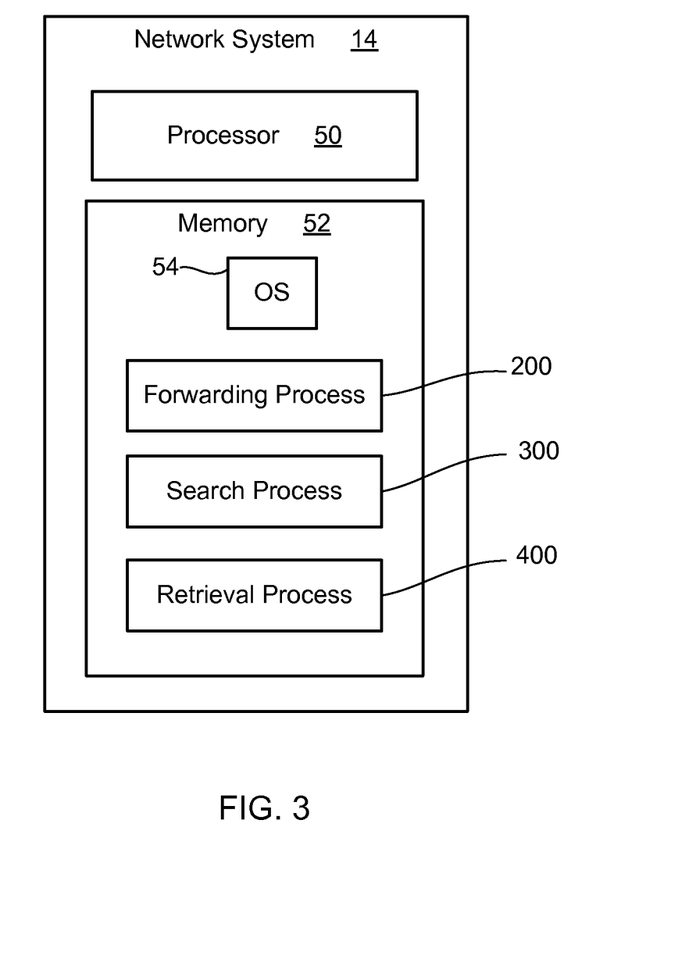
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, a data file forwarding process 200, a search process 300 and a retrieval process 400, fully described below.

One network system, such as network system 22, is designated as a deletion node, more fully described below. Memory of the deletion node 22 does not include a data file forwarding process 200, search process 300 and retrieval process 400. Any data file received by the deletion node is not forwarded or saved. New data received in the memory of the deletion node overwrites old data received by the memory of the deletion node. In effect, the deletion node 22 acts as a black hole for data files forwarded to it.

In traditional systems, application processes 38 need to store, delete, search and retrieve data files. In these traditional systems, a data file is stored on local or remote physical devices. And in some systems, this data file can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data files. Herein, the terms "data file" are used to represent all file and media types handled by the system, such as, for example, files for data, program files, audio files, video files, picture files, and so forth. When a request to store a data file is received by the central server 14 from storage process 100, the data file is directed to a node memory in the framework 10 where it is then continuously forwarded from node memory to node memory in the framework 10 by the data file forwarding process 200 in each of the network nodes without storing on any physical storage medium, such as a disk drive. The forwarded data file resides only for a very brief period of time in the memory of any one node in the framework 10. Data files are not stored on any physical storage medium in any network node.

When a request to retrieve a data file is received by the central server 14 from storage process 100, the requested data file, which is being forwarded from node memory to node memory in the framework 10, is retrieved.

Data files forwarded in this manner can be segmented and segments forwarded as described above. Still, the segmented data is not stored on any physical storage medium in any network node, but forwarded from the memory of one node to the memory of another node.

Data files being forwarded in this manner can be deleted and thus no longer forwarded from node memory to node memory.

Figure 4:
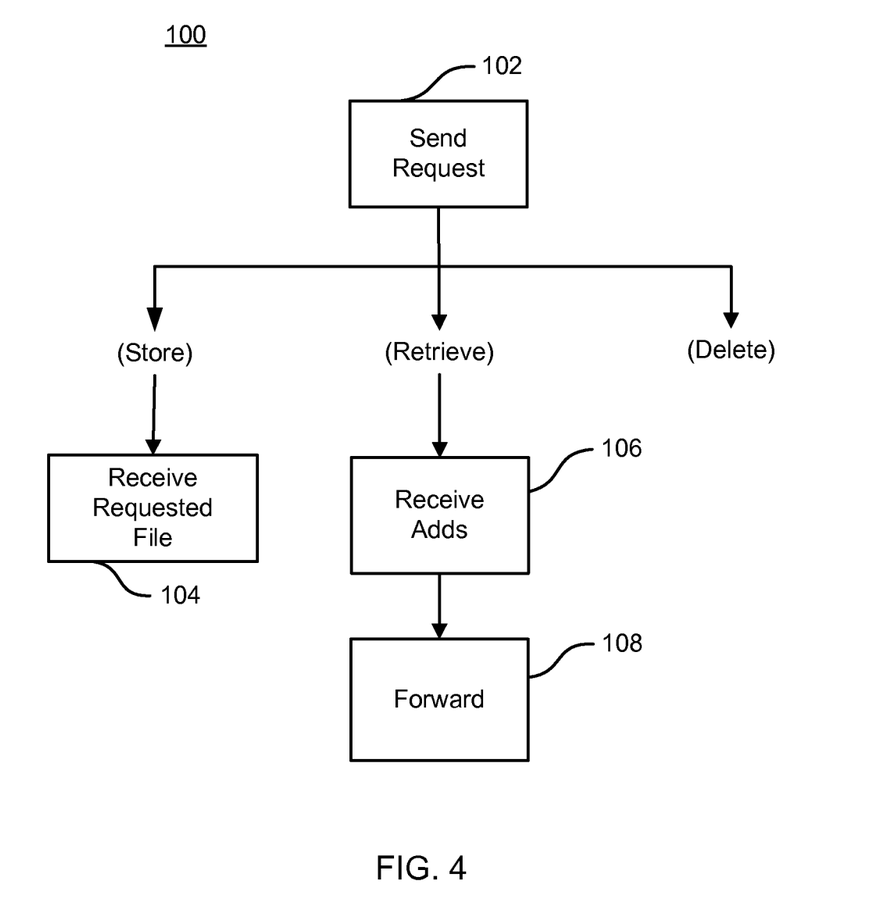
FIG. 4 is a flow diagram of a process.

As shown in FIG. 4, storage process 100 includes sending (102) a request to a central server 14 to store, retrieve or delete a data file. If the request is a retrieve data file request, storage process 100 receives (104) the requested data file from the central server 14 or node in the network.

If the request to the central server 14 is a store data file request, storage process 100 receives (106) an address of a node from the central server 14 and forwards (108) the data file to the node memory represented by the received address.

Figure 5:
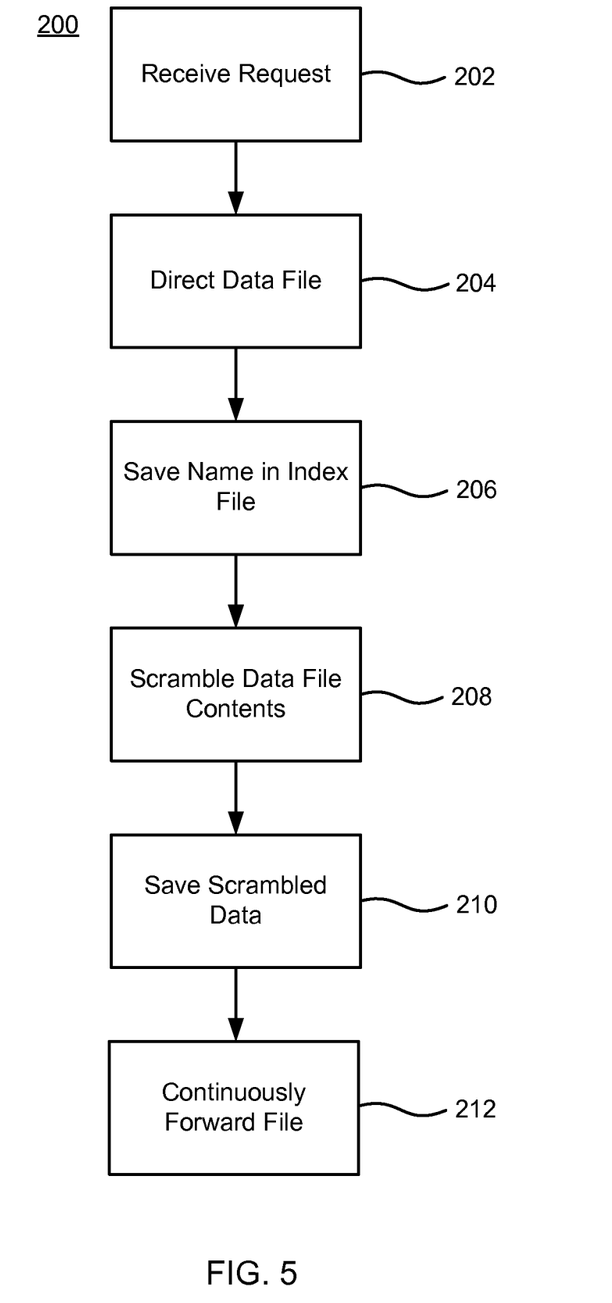
FIG. 5 is a flow diagram of a process.

As shown in FIG. 5, data file forwarding process 200 includes receiving (202) a request from a source system in a network to store a data file.

Process 200 directs (204) the data file to a computer memory in a network. Process 200 saves (206) a file name of the data file, and in some implementations, a file type, a username and a date stamp, in an index file associated with the central server 14; the actual data contained in the data file is not stored on any physical medium. The index file is used to search for data files during the search process 300, described fully below. Process 200 scrambles (208) a copy of the contents of the data file and saves (210) the copied scrambled data in memory or on a physical storage device associated with the central server 14.

For example, assume a data file named "myfile.txt" includes the following text:

This is an example of data contained in an exemplary data file. The text herein is maintained as written in the data file and the data file continuously forwarded from node memory to node memory without storing on a physical medium.

Scrambling (208) a copy of the above data file may, in one example, results in the following scrambled data:

to without storing on a physical medium example node this contained exemplary herein file from maintained text data. and the in continuously is an of forwarded memory Only this scrambled data, indexed by file name, is saved to physical storage—no unscrambled data file is stored in any physical medium, such as a disk drive. Saving the copied scrambled data aids in maintaining security and in searching for data files being continuously forwarded.

Process 200 continuously forwards (212) the data file from the first computer memory to other computer memories in the network without storing on any physical storage device in the network. Continuously forwarding (212) includes detecting a presence of the data file in memory of the specific node of the network and forwarding the data file to another computer memory of a node in the network of interconnected computer system nodes without storing any physical storage device.

In one specific example, at the point of entry to a node, forwarded data in the data file undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

New nodes and node states may be added and/or deleted from the framework 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the framework 10 from any valid peer point with the same security systems employed, as well as custom solutions suitable for the rigors of specific deployments, such as wireless encryption schemes for wireless peers, and so forth.

In process 200, rather than have data files cached or held in remote servers, hard drives or other fixed storage medium, the data files are passed, routed, forwarded from node memory to node memory. A user on the system may authorize more than one user to have access to the data file.

A primary goal in process 200 is to generate a data storage and management system where the data file is never fixed in physical storage, but in fact, is continually being routed/forwarded from node memory to node memory. The path of the nodes to which a data file is forwarded may also be altered by the central server 14 to adjust for system capacities and to eliminate redundant paths of data files that may weaken the security of the network due to the increased probability of data file path without this feature.

Figure 6:
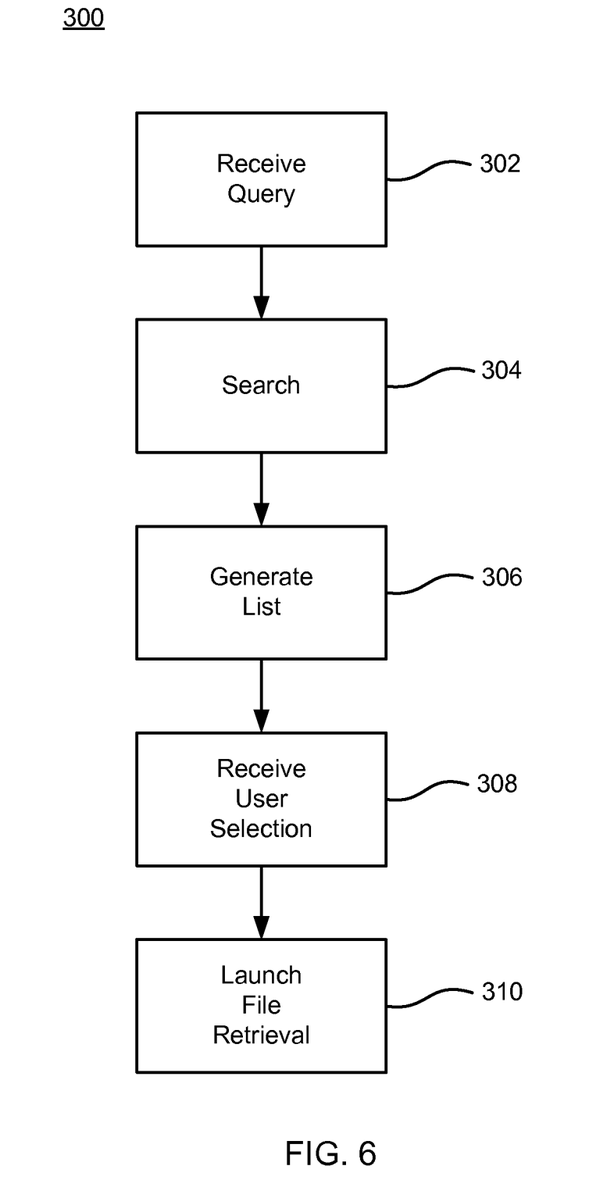
FIG. 6 is a flow diagram of a process.

As shown in FIG. 6, the search process 300 includes receiving (302) a query. Example queries include filenames, file types, usernames, dates and so forth. In one example, the query is a keyword or keywords. Search process 300 searches (304) the database of scrambled files represented by the index of file names for a match of the keyword or keywords. If a match of the keyword or keywords is found among the scrambled files, process 300 generates (306) a list of filenames containing the keyword or keywords. In one example, the list of file names is displayed to a user on an input/output device, enabling the user to select one of the file names. In another example, the list of filenames displayed includes supplemental information with respect to the file, such as, file type, file size, date saved and/or last modified, and so forth. Process 300 receives (308) a user selection of one of the filenames contained in the generated list of file names. The user selection can include a mouse click, a key board input, an audio input, and so forth, indicating a selected filename.

Figure 7:
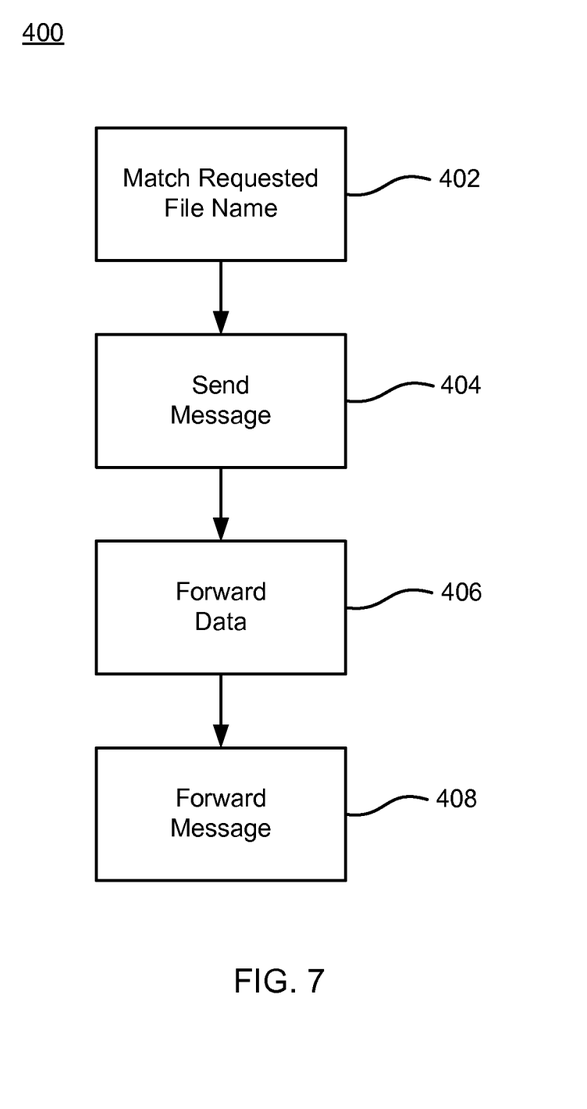
FIG. 7 is a flow diagram of a process.

Process 300 launches (310) a file retrieval process 400.

As shown in FIG. 7, the file retrieval process 400 matches (402) the requested filename at the central server using a hash mark or other unique code that can be "sniffed" by the node upon the data entering the node via the encryption handshake. This can occur by pinging the nodes in the network. Process 400 sends (404) the message to return the data to the user directly to the node or node state where the central server believes the data will likely appear. The more the central server can narrow the node state that it pings to, then the more efficient the retrieval will become and the less burdened by unnecessary messaging traffic to nodes that are not necessary for a transaction between the central server and the node capable of forwarding the data.

Once the correct node receives the message to forward the data in node memory to the requester, process 400 forwards (406) in node memory the data to the requester and forwards (408) a confirmation message that the data has been sent to the user. This routing message may be sent directly to the central server or may be passed to the central server or servers via other node(s) or supernode(s) in the framework 10. Upon the user receiving the requested data the user's application functions to automatically ping the central server that the data requested has been received. Thus the framework 10 creates data storage without caching, downloading and/or storing the data on any physical storage medium. Data storage and management is accomplished via a continuous routing of the data from node memory to node memory.

In another embodiment, storage process 100 only stores the scrambled data along with filename, and in some instances, file type, username, and/or date stamp, while automatically deleting the non-scrambled data file.

Figure 8:
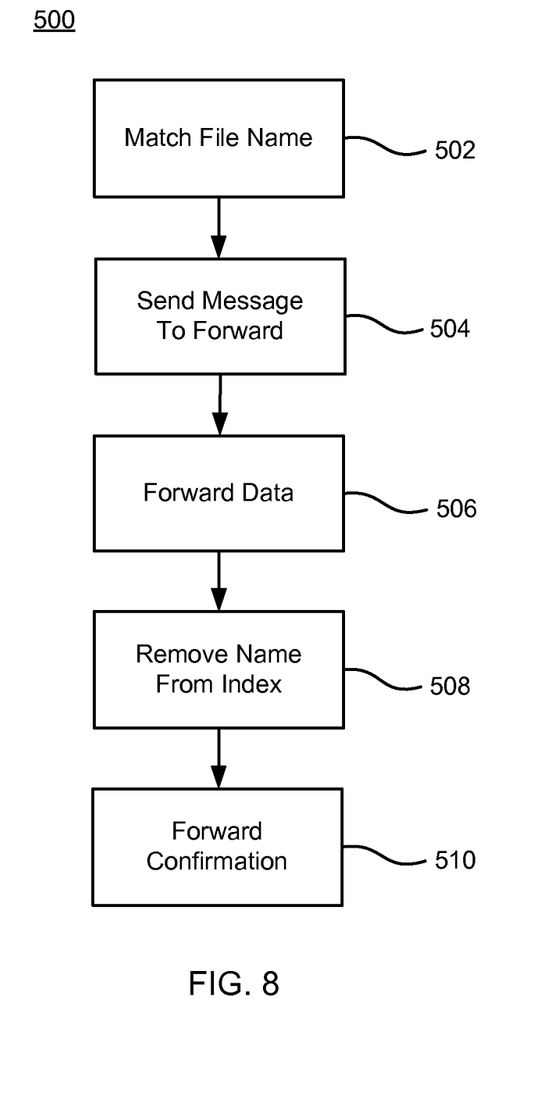
FIG. 8 is a flow diagram of a process.

If the request to the central server 14 is a delete data file request, the central server 14 launches a file deletion process 500. As shown in FIG. 8, process 500 matches (502) the filename to delete at the central server 14 using a hash mark or other unique code that can be "sniffed" by the node upon the data entering the node via the encryption handshake. This can occur by pinging the nodes in the network. Process 500 sends (504) the message to forward the data to the deletion node 28 directly to the node or node state where the central server believes the data will likely appear. The more the central server can narrow the node state that it pings to, then the more efficient the retrieval will become and the less burdened by unnecessary messaging traffic to nodes that are not necessary for a transaction between the central server and the node capable of forwarding the data.

Process 500 forwards (506) in node memory the data to the deletion node. Process 500 removes (508) the data file name from the index and forwards (510) a confirmation message that the data has been deleted to the user. This routing message may be sent directly to the central server or may be passed to the central server or servers via other node(s) or supernode(s) in the framework 10.

The framework 10 creates data storage without caching, downloading and/or storing the data on any physical storage medium. Data storage and management is accomplished via a continuous routing of the data from node memory to node memory, the forwarded data only downloaded when the user requests the data to be returned to the user from the framework 10.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
   receiving, at a computing system, a request from an authorized user to delete a particular data file being continuously forwarded among memories of computing devices within a network, wherein a plurality of data files comprising the particular data file are stored in the network by continuously forwarding the plurality of data files among memories of the computing devices without storing the plurality of data files on fixed storage mediums of the computing devices, wherein computing devices to which respective data files are forwarded are determined dynamically at computing devices receiving the respective data files based on statuses of respective computing devices and/or one or more statuses of the network;
   searching, by the computing system, a data structure including information associated with respective data files of the plurality of data files for information associated with the particular data file;
   determining, by the computing system, one or more memories storing the particular data file; and
   transmitting, by the computing system, instructions to the computing devices associated with the determined one or more memories to discontinue forwarding of the particular data file.

2. The method of claim 1, wherein the request is received from a computing system operated by the authorized user.

3. The method of claim 2, wherein the computing system is operated by the authorized user that originally provided the particular data file for storage among the memories of the computing devices.

4. The method of claim 1, further comprising:
   removing information associated with the particular data file from the data structure.

5. The method of claim 1, further comprising:
   transmitting instructions to the computing devices associated with the determined one or more memories to store other data files in memory locations occupied by the particular data file.

6. The method of claim 1, wherein the information associated with respective data files comprises file names for the respective data files.

7. The method of claim 1, wherein said determining comprises:
   determining a hash mark for the particular data file; and
   comparing the determined hash mark to hash marks associated with data files stored in memories of respective computing devices.

8. The method of claim 1, wherein said determining comprises:
   determining a unique identifier of the particular data file; and
   transmitting the unique identifier to at least some of the computing devices.

9. The method of claim 8, wherein said determining further comprises:
   determining a subset of the computing devices that are most likely to have the particular data file stored on respective memories; and
   transmitting the unique identifier to only the subset of the computing devices.

10. The method of claim 1, further comprising:
    receiving a confirmation message from the computing devices associated with the determined one or more memories indicating that the particular data file has been deleted.

11. A non-signal computer readable medium having instructions stored thereon, the instructions configured for execution by a computing system in order to perform operations comprising:
    receiving a request to delete a particular data file being continuously forwarded among memories of computing devices within a network, wherein a plurality of data files are stored by continuously forwarding the data files among memories of the computing devices without storing the data files on fixed storage mediums of the computing devices, wherein computing devices to which respective data files are forwarded are determined dynamically at computing devices receiving the respective data files based on statuses of respective computing devices and/or one or more statuses of the network;
    searching a data structure including information associated with respective data files being continuously forwarded among memories of the network computing devices for information associated with the particular data file;
    determining one or more memories storing the particular data file; and
    transmitting instructions to the network computing devices associated with the determined one or more memories to not forward the particular data file.

12. The non-signal computer readable medium of claim 11, wherein the request is received from a computing system that provided the particular data file for storage among the memories of the network computing devices.

13. The non-signal computer readable medium of claim 11, wherein the operations further comprise:
    removing information associated with the particular data file from the data structure.

14. The non-signal computer readable medium of claim 11, wherein the information associated with respective data files comprises file names for the respective data files.

15. The non-signal computer readable medium of claim 11, wherein said determining comprises:
    determining a unique identifier of the particular data file; and
    transmitting the unique identifier to at least some of the network computing devices.

16. The non-signal computer readable medium of claim 11, wherein the operations further comprise:
    receiving a confirmation message from one or more computing devices associated with the determined one or more memories indicating that the particular data file has been deleted.

17. A computing system comprising:

a hardware processor configured to execute instructions;

a computer readable medium storing instructions readable by the processor in order to cause the computing system to perform operations comprising:

receiving a request to delete a particular data file being continuously forwarded among memories of computing devices within a network, wherein the network stores a plurality of data files by continuously forwarding the data files among memories of the computing devices without storing the data files on a fixed storage medium of the computing devices, wherein computing devices to which respective data files are forwarded are determined dynamically at computing devices receiving the respective data files based on statuses of respective computing devices and/or one or more statuses of the network;

searching a data structure including information associated with respective data files being continuously forwarded among memories of the computing devices for information associated with the particular data file;

determining one or more memories storing the particular data file; and transmitting instructions to the network computing devices associated with the determined one or more memories to not forward the particular data file.

18. The computing system of claim 17, wherein the request is received from an authorized computing system operated by a user that provided the particular data file for storage among the memories of the network computing devices.

19. The computing system of claim 17, further comprising: removing information associated with the particular data file from the data structure.

20. The computing system of claim 17, further comprising: transmitting instructions to the computing devices associated with the determined one or more memories to store other data files in memory locations occupied by the particular data file.

* * * * *